Oct. 6, 1936. W. G. G. BENWAY 2,056,383
ADVERTISING DISPLAY SIGN
Filed June 16, 1934 3 Sheets-Sheet 1

William G. G. Benway
INVENTOR

BY Darby & Darby
ATTORNEYS

Oct. 6, 1936.   W. G. G. BENWAY   2,056,383
ADVERTISING DISPLAY SIGN
Filed June 16, 1934   3 Sheets-Sheet 2

William G. G. Benway
INVENTOR

BY Darby & Darby
ATTORNEYS

Oct. 6, 1936. W. G. G. BENWAY 2,056,383
ADVERTISING DISPLAY SIGN
Filed June 16, 1934 3 Sheets-Sheet 3
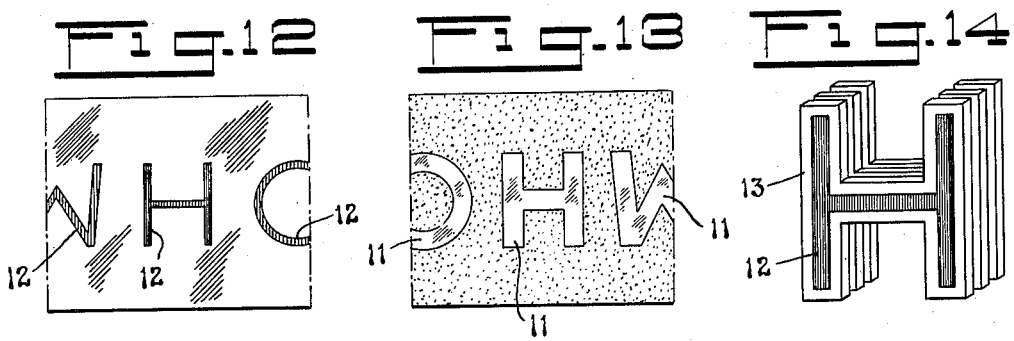
INVENTOR
William G. G. Benway
BY
Darby & Darby
ATTORNEYS Patented Oct. 6, 1936

2,056,383

UNITED STATES PATENT OFFICE 2,056,383

ADVERTISING DISPLAY SIGN

William G. G. Benway, New York, N. Y.

Application June 16, 1934, Serial No. 730,866

13 Claims. (Cl. 40—132)

The invention relates to advertising display signs and more particularly to display signs of the type described and illustrated in United States Letters Patent No. 1,202,593, issued October 24, 1916 to G. McI. Scott, wherein a plurality of reflecting mirrors spaced apart from each other are utilized to produce multiple images of the pictures, designs or lettering comprising the advertising matter.

In the prior advertising display signs of the above mentioned type, the reflected multiple images of the advertising design are produced in such a manner that they present an appearance to the eye of being merely flat repetitions of the original design. Also the colors appearing in the original design are merely repeated in the multiple images produced and it is not possible to vary the color effect thereof. Furthermore, due to the manner in which the design of the advertising matter is formed and presented to the reflecting mirrors, and to the manner in which the display sign is constructed and arranged, it is only possible to provide a limited number of reflected images of the advertising matter and the illuminated effect thereof is not of a particularly brilliant character.

It is one of the important objects of the present invention to improve upon the construction of these prior types of advertising display signs by providing a method of forming the design of the advertising matter on the reflecting mirror of the device so that novel and attractive third dimensional effects thereof will be presented to the eye in the multiple images produced.

A further important object of the invention is to provide an improved construction of an advertising display sign of the above mentioned type which will make it possible to produce an increased number of the reflected images of the advertising matter and to provide said images with an increased illuminated brilliancy.

A further object of the invention is to provide a multiple image advertising sign wherein continuous changing color effects can be imparted to the multiple images produced by the advertising matter by the reflecting mirrors thereof.

Additional objects, advantages and features of construction and combination of means and details will be made manifest in the ensuing specification of the illustrative apparatus; it being understood that modifications, variations and adaptations may be resorted to within the spirit, scope and principle of the invention as it is more directly claimed hereinafter.

In the accompanying drawings:

Fig. 12 is a broken front face view of a further modified type of design which may be formed on the rear mirror.

Fig. 13 is a broken rear face view of the mirror shown in Fig. 12.

Fig. 14 is an illustration of the manner in which the letter "H" formed on the mirrors of Figs. 12 and 13 will appear to the eye when multiple images of the word are produced by the reflecting mirrors of the sign.

Figure 1:
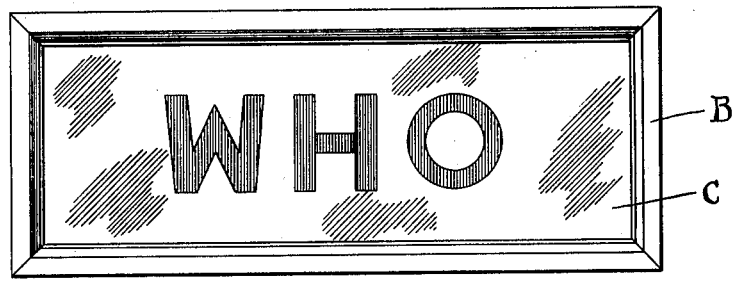
Figure 1 is a front elevational view of a typical type of construction of a multiple image advertising sign that may be employed in carrying out the objects of my invention.
Figure 2:
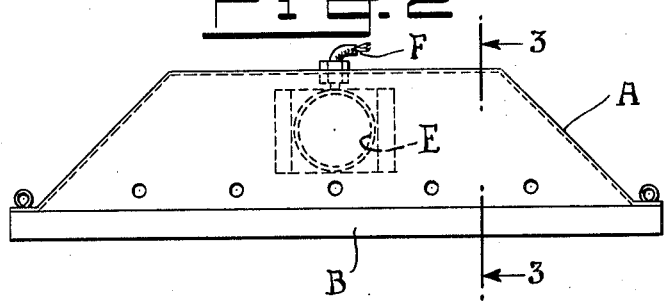
Fig. 2 is a top plan view of Figure 1.
Figure 3:
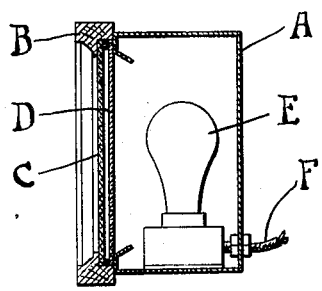
Fig. 3 is a sectional view of Fig. 2 taken on the line 3—3 looking in the direction of the arrows.

Referring to Figures 1, 2 and 3 of the drawings I have shown my invention as applied to an advertising display sign constructed in the manner shown and having the arrangement of spaced reflecting mirrors as illustrated and described in the above mentioned Letters Patent No. 1,202,593 but it is obvious that various other changed forms of construction of the sign may be utilized without departing from the spirit or scope of my invention. As illustrated in the drawings the sign may consist of a box or chamber A constructed of any suitable reflecting material. The front of the box is provided with a closure frame which is so formed that two glass mirrors C and D may be mounted therein in spaced relation to each other. The front mirror C is transparent and consists of a sheet of glass provided with a thin coating of silver on its rear face which coating is just sufficient to form a reflecting surface by reflected light and sufficiently thin to enable one to see through the glass. The rear mirror D is provided with a thick silvered coating on the rear face which is not transparent to transmitted light.

Figure 4:
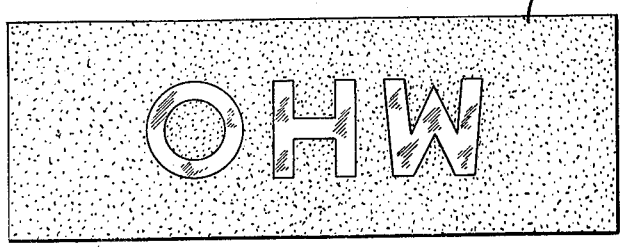
Fig. 4 is a view of the rear face of the rear reflecting mirror of the sign shown in Figures 1, 2 and 3, and which is shown with a design consisting of the word "Who" formed thereon in a reverse manner and in accordance with the method comprising my invention.
Figure 6:
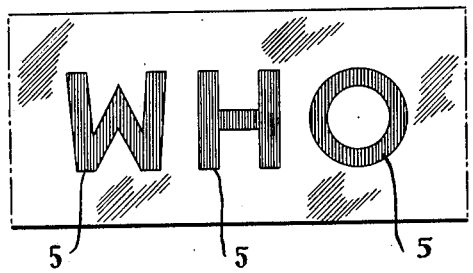
Fig. 6 is a front face view of a rear mirror which may be used in the sign and showing a modified form of design that may be formed on the same.
Figure 7:
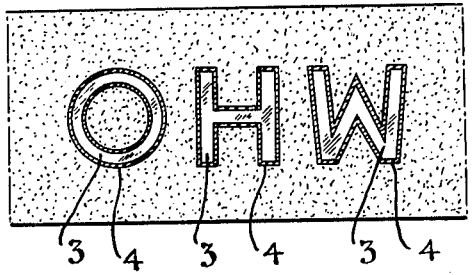
Fig. 7 is a rear face view of the mirror shown in Fig. 6.
Figure 8:
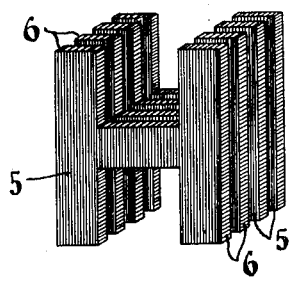
Fig. 8 is an illustration of the manner in which the letter "H" of the word formed on the rear mirror of Figs. 6 and 7 will appear to the eye in the multiple image formed when the images of the word are produced by the reflecting mirrors.

The advertising matter to be displayed by the sign in the form of multiple images is, for convenience of illustration, shown as the word "Who". In accordance with my invention and as shown in Figures 1 to 5, the word "Who" is produced on the rear mirror as follows:

The silvering on the rear face of the mirror D is removed by etching or otherwise so as to form the letters of said word. The silvering is removed entirely, as indicated in Fig. 4, so that the letter design is represented by plain transparent glass. On the front face of the rear mirror D at the places where the letters of the word "Who" are represented by clear glass, the said glass is provided with a coating of a suitable translucent color or colors, said color coating coinciding with the shape of said letters in the manner shown in Fig. 6 and as described in connection with the glass shown in said figure.

It will be noted that in producing the letter design in this manner there is provided a translucent design on the rear non-transparent mirror and that the color for the design is only applied on the front face of said mirror.

The translucent design thus formed on the rear mirror is adapted to be illuminated by means of a suitable light source such as the electric lamp indicated at E which is mounted in the closed opaque chamber A at the back of the mirror D.

With the mirrors arranged with respect to each other as above set forth and with the design formed in the above described manner, it will be seen that when light rays from the lamp E are directed through the translucent design on the rear mirror, reflected images will be produced of said design. For instance, an image will be produced of the design at a distance in front of the rear face of the front mirror C which will be equal to the distance between the said rear face of mirror C and the rear face of the rear mirror D. That image will in turn produce an image appearing as far behind the rear face of mirror D as the first image is before the rear face of the mirror D.

The second image will give rise to a further image by reflection from the mirrored rear surface of the front mirror C and these images will be repeated and formed a multiple number of times directly behind one another and at a distance apart which is twice that separating the rear face of the rear non-transparent mirror C To the eye of one looking at the advertising display sign, the effect will be that of a plurality of consecutive equally spaced images of the advertising matter.

Figure 5:
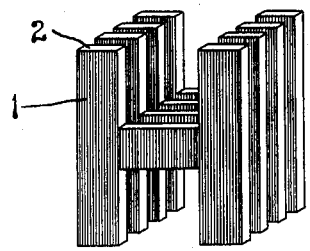
Fig. 5 is an illustration of the manner in which the letter "H" of the word formed on the rear mirror of the sign of Figures 1, 2 and 3 will appear to the eye in multiple image form when the images of the word are produced by the reflecting mirrors.

When the design of the advertising matter is formed on the rear mirror in the manner above described, an extremely novel effect not present in prior signs of this type, is produced in the multiple images created by the reflecting mirrors. Due to the fact that the translucent coloring of the design is applied on the front face of the rear mirror there is provided a thickness of clear glass equal to the thickness of the mirror underneath the said coloring and when light rays from the lamp are transmitted through the design said light rays not only illuminate the colored portion of the letters so that they are presented as a flat colored design, but they also iluminate the clear glass between the front and rear face of the mirror and produce an effect as if the portion between the colored letter and its shadow was filled with a clear white illumination of the exact shape of the letters. To an observer, images of the letters of the design will appear to have a third dimension as indicated in Fig. 5. As shown in that figure which merely represents the letter "H" of the design, the images of the front face 1, of the letter will appear as a flat illuminated color and the edge 2 of the letter will appear as a brilliantly illuminated white light in the exact shape of the design so that a block effect to the letter will be presented.

It will be noted that when the light rays from the lamp are projected through the rear mirror in this manner, part of said rays are transmitted through clear glass and therefore a greater illumination of the reflected images of the advertising design will be created and there will be produced a more brilliantly lighted effect therefor. The increase of illumination makes it possible to effect the production of a greater number of reflected images and therefore the illusion of the repetition of the advertising matter is enhanced.

Many variations in the manner of forming the designs of the advertising matter in accordance with the above described method can obviously be devised. In Figures 6 to 14 I have indicated a few ways of varying the designs to produce novel artistic effects. For instance, in Figures 6, 7 and 8, I have shown the rear mirror having the word "Who" formed thereon by causing the rear face of the rear mirror (Fig. 7) to be etched so that the shapes of the letters are formed of a clear glass indicated at 3. Then a narrow border 4 of a selected translucent color is painted around the edges of the clear glass lettering on the rear face of said mirror. The front face of the mirror is provided with another desired translucent color 5 (see Figure 6) which is applied completely over the design. When light rays are transmitted through a design so formed the sign will produce a series of reflected images located one behind the other which will appear to the eye in the manner indicated in Fig. 8. As illustrated in that figure it will be seen that the front face 5 of the letter will appear as a flat illuminated color whereas the block or third dimensional portion of the images will appear as indicated at 6 in the color of the border 4 which was applied to the back of the mirror.

Figure 11:
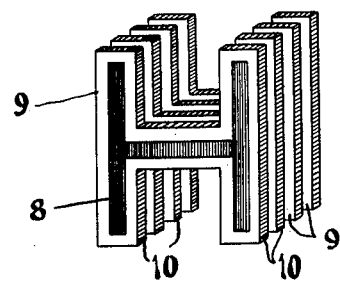
Fig. 11 is an illustration of the letter "H" of the word formed on the rear mirror of Figs. 9 and 10 and showing the manner in which said letter will appear to the eye in multiple image form in the advertising sign.
Figure 9:
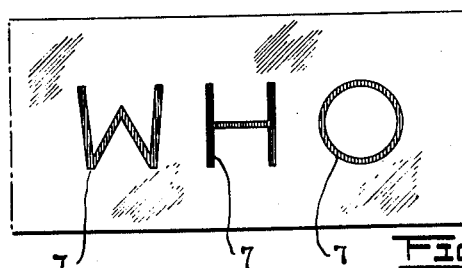
Fig. 9 is a front face view of a rear mirror and showing a further modified form of design which may be formed thereon in carrying out the objects of my invention.
Figure 10:
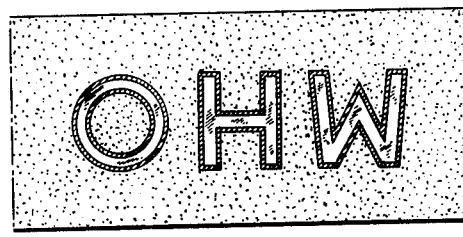
Fig. 10 is a rear face view of the mirror shown in Fig. 9.

In Figures 9 to 11, a further variation of designs is shown. In producing this design the rear face of the non-transparent mirror is etched out completely to form the word design and a colored border is painted around the edges of the clear glass forming the letters of the design in the same manner as in the design illustrated in Fig. 7. On the front face of the mirror however, instead of applying color over the entire surface of the clear glass word design, the color is only applied to a portion of the design as indicated at 7 in Fig. 9. The rest of the letter design is left as plain glass. When the light rays are transmitted through a design formed in this manner, the images of the letters will appear to the eye in a block or third dimensional form as indicated in Fig. 11. The color applied to the front of the mirror will appear in the images as a narrow flat illuminated formation indicated at 8. Surrounding this flat color formation there will appear a brilliantly lighted clear glass portion 9 and due to the light rays being transmitted through the thickness of the glass as well as straight through the same, as above described, the images of the letter will appear to have an illuminated colored third dimensional effect as indicated at 10 and which will correspond to the border color applied around the edges of the clear glass on the rear face of the mirror.

In Figures 12 to 14 a further variation of the manner of forming the design is illustrated. In the design shown in these figures the rear face of the mirror is etched out so that the design is completely formed of clear glass as indicated at 11. (See Fig. 13.) The front face of the mirror is prepared in the same manner as the front face of the mirror in Figure 8 was prepared. That is, the color on the front face is only applied to a portion of the width of the letters W H and O as indicated at 12. When such a mirror is employed in the advertising display sign, the light rays when transmitted through the design will cause multiple images to be produced which will appear to the eye as indicated in Fig. 14. As shown in this figure the portion 12 of the letter will appear as a flat illuminated color. The portion 12 will also be bordered by a brilliantly illuminated clear glass portion 13 and due to the light rays being transmitted through a thickness of clear glass the letter design will have the appearance of having a third dimension which will be directly illuminated by the light rays from the lamp.

Figure 16:
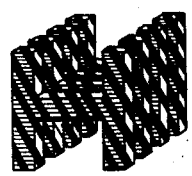
Fig. 16 is a view indicating the manner in which the multiple images of a design consisting of the letter "H" will appear to the eye when images thereof are reflected by the mirrors of the sign shown in Fig. 23.
Figure 15:
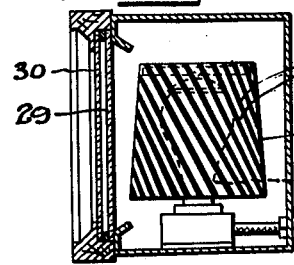
Fig. 15 is a side elevational view in section of a multiple image advertising sign which may be utilized in carrying out the purposes of my invention and showing means associated with the illuminating means of the sign for producing a continuous changing color effect to the multiple images reflected by the mirrors.

When utilizing the multiple image advertising display sign wherein the advertising matter is formed on the rear mirror, either in the usual well known conventional manner, or in the manner of my invention, a continuous changing color effect may be imparted to the multiple reflected images produced by the means illustrated in Fig. 15. Referring to said figure it will be observed that associated with electric incandescent lamp 26 is a translucent rotatable shade 27 which is provided with a multi-colored transparent design, such as a series of differently colored stripes indicated at 28. The shade is so formed and mounted on the tip of the lamp, in a well known manner that the heat emanating from the lamp will cause said shade to slowly rotate. As the light rays from the lamp are directed through the rotating shade and through the transparent design formed on the rear mirror 29, the multiple reflected images of the design created by the reflections of the front and rear mirrors of the sign will have imparted thereto continuously changing color effects such as are indicated in Figure 16.

It will be seen from the above description that because of the novel method of forming the design to be displayed on the surfaces of the mirrors and said mirrors being arranged as above described, many new and varying artistic and attractive effects can be produced in the multiple reflected images created by the sign. Also an increased illumination of the images reflected is provided which in turn causes the number of the images to be increased. Furthermore by utilizing the methods of forming the design on one or two mirrors as above described varying color effects can be imparted to the reflected images.

What I seek to secure by United States Letters Patent is:

1. A multiple image advertising sign consisting of a front sheet of transparent material having a translucent reflecting coating applied to one of the faces thereof, in combination with a rear mirror having a translucent design thereon comprised of designed portions of clear transparent glass having transparent color applied thereto on the front face of the mirror coextensive at the most with the design portions.

2. A multiple image advertising sign consisting of a front sheet of transparent material having a translucent reflecting coating applied to one of the faces thereof, in combination with a rear mirror having a translucent design thereon comprised of designed portions of clear transparent glass having transparent color applied thereto on the front and rear faces of the mirror coextensive at the most with the design portions.

3. A multiple image advertising sign consisting of a front sheet of transparent material having a translucent reflecting coating applied to one of the faces thereof in combination with a rear mirror having a translucent design thereon comprised of designed portions of clear transparent glass formed on the mirrored face of said mirror and transparent color applied to the other face of the mirror only within those areas which register with said design.

4. A multiple image advertising sign comprising a front sheet of transparent material having a translucent reflecting coating applied to the front face thereof, in combination with a rear mirror having a heavily silver coated rear face and a plain glass front face and which is provided with a translucent design formed by the removal of portions of the silver coating on the rear face thereof and by the application of transparent color on the front face thereof at the points corresponding to the design.

5. A multiple image advertising sign comprising a front sheet of transparent material with a translucent reflecting coating applied to one face thereof, in combination with a rear mirror having a heavily silver coated rear face and a plain glass front face and which is provided with a translucent colored design formed by the removal of portions of the silver coating on the rear face and by the application of transparent color on portions of the surface provided on the rear face when the silver coating is removed and on the front face at the points corresponding to the entire design.

6. A multiple image advertising sign comprising a front sheet of transparent material with a translucent reflecting coating applied to one of the faces thereof, in combination with a rear mirror having a silver coated rear face and a plain glass front face and which is provided with a transparent colored design formed by the removal of portions of the silver coating on the rear face of the mirror and by the application of a transparent color on the front face thereof at points corresponding to certain parts of the design.

7. A multiple image advertising sign comprising a front sheet of transparent material with a translucent reflecting coating applied to one of the faces thereof, in combination with a rear mirror having a silver coated rear face and a plain glass front face and which is provided with a translucent colored design formed by the removal of portions of the silver coating on the rear face of the mirror and the application of a transparent color to the border of the design so formed, and by the application of a translucent color on the plain glass front face of the mirror at points corresponding to certain portions of the design.

8. In a multiple image advertising sign the combination of a plurality of spaced reflectors including a transparent mirror and a non-transpatent mirror a translucent colored design formed on one of said reflectors by etching on one side thereof and the application of a translucent color on the other side thereof coextensive with the area of the etched design and so that it will be reflected back and forth between the said reflectors to produce multiple images which have a third dimensional effect and a different color effect in the two dimensional and in the third dimensional portions thereof, and means for imparting a continuous change of the color effect of the said images.

9. In a multiple image advertising sign the combination of a plurality of spaced reflectors including a transparent mirror and a non-transparent mirror, said non-transparent mirror having one of its faces provided with a silver coating and with a design of clear glass etched therein and the other face provided with a transparent color at the points thereon coinciding with the clear glass design, said reflectors being positioned in such spaced relation with respect to each other that the design formed on the non-transparent mirror will be reflected back and forth between the reflectors and produce multiple colored images.

10. In a multiple image advertising sign the combination of a transparent mirror positioned in front of and in spaced relation to a non-transparent mirror, said non-transparent mirror having its rear face provided with a coating of silver, and a design formed on the non-transparent mirror by the removal of certain portions of the silver coating and the application of a translucent band of color around the edges of said removed portions and by the application of a contrasting translucent color to the front face of said mirror at points coinciding with the etched design.

11. In a multiple image advertising display sign, the combination of a chamber formed of a reflecting material, means for illuminating said chamber, a closure frame for said chamber provided with a sheet of transparent material for the outer face thereof and a non-transparent mirror for the inner face thereof, said sheet of transparent material having a translucent reflecting coating applied to the front face thereof and said mirror being spaced from the said sheet of transparent material and having a heavily silver coated rear face and a plain glass front face, and transparent colored design formed on said mirror by the removal of portions of the silver coating on the rear face thereof and by the application of translucent color on the front face thereof at the points thereon coinciding with the design.

12. In a multiple image advertising display sign, the combination of a chamber formed of a reflecting material, means for illuminating said chamber, a closure frame for said chamber comprising a front sheet of transparent glass having one face thereof provided with a translucent reflecting coating, and a rear mirror spaced from the front transparent glass and having its rear face provided with a non-transparent coating of silver, said rear mirror having a translucent colored design formed thereon by the removal of portions of the silver coating on the rear face thereof and by the application of translucent color to its front face at the points corresponding to the design.

13. In a multiple image advertising sign, the combination of a plurality of spaced reflectors, including a transparent mirror and a non-transparent mirror, and a translucent multi-colored design formed on the non-transparent reflector by etching on either side thereof and the application of color within but not coextensive with the area of the etched design and so that it will be reflected back and forth between the said reflectors to produce multiple images which have a third dimensional effect and a plurality of colors in the two dimensional portion thereof and a different color in the third dimensional portion.

WILLIAM G. G. BENWAY.